United States Patent

[11] 3,621,974

[72] Inventor Elliott Bavers
  New York, N.Y.
[21] Appl. No. 867,125
[22] Filed Oct. 17, 1969
[45] Patented Nov. 23, 1971
[73] Assignee Rotodyne Manufacturing Corporation
  Brooklyn, N.Y.

[54] CONVEYORS FOR ROTATABLY MOVING CONTAINERS
  14 Claims, 6 Drawing Figs.
[52] U.S. Cl. .................................................. 198/33 AB
[51] Int. Cl. ..................................................... B65g 47/24
[50] Field of Search .......................................... 198/25, 33 AB, 41

[56] References Cited
  UNITED STATES PATENTS
  2,709,856 6/1955 Hunter et al. .................. 198/33 AB
  3,090,476 5/1963 Sanders ....................... 198/25

*Primary Examiner*—Joseph Wegbreit
*Attorney*—Victor M. Helfand

ABSTRACT: Conveying apparatus for rotatably moving containers and including an endless conveyor mounting spaced, rotatable container-supporting stands and means for rotating the supporting stands, a magnet set into the container-supporting surface of each stand, and means automatically moving containers onto successive stands, including a platform for supporting containers and having a hinged extension formed with an opening arranged to overlie the path of the stands and means for pushing a container from the platform onto the hinged extension, means lowering the hinged extension to slide a container onto a platform, said extension-lowering means and said container-pushing means synchronized to lower the extension upon movement of a supporting member below said opening and for pushing a container onto the extension while said extension is in level position with the platform.

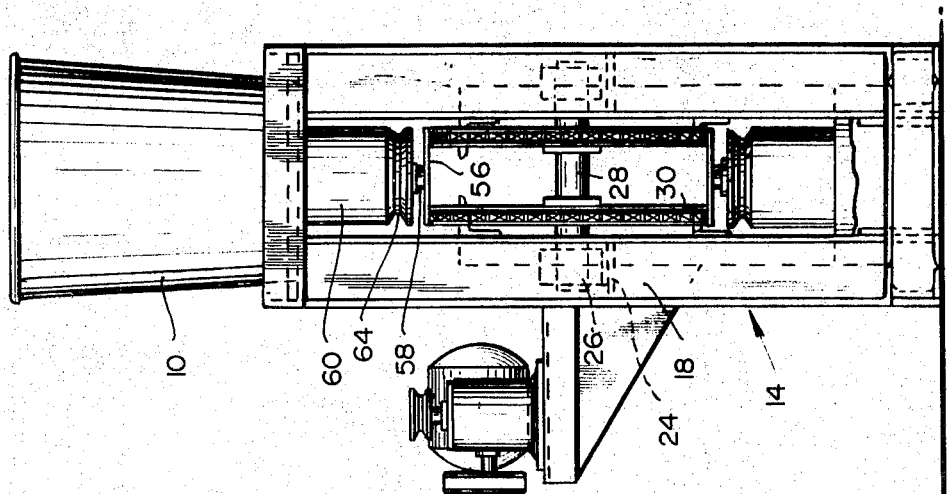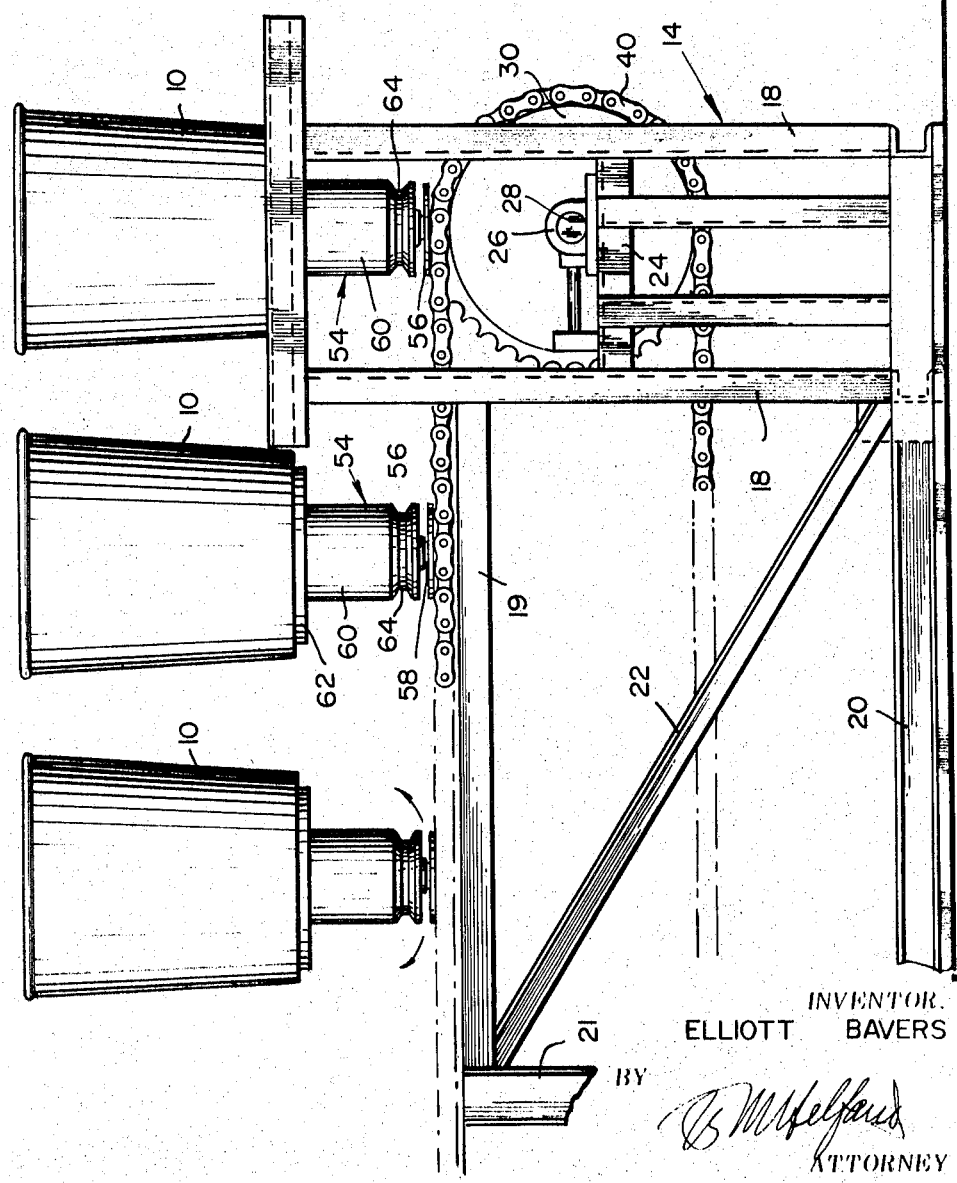

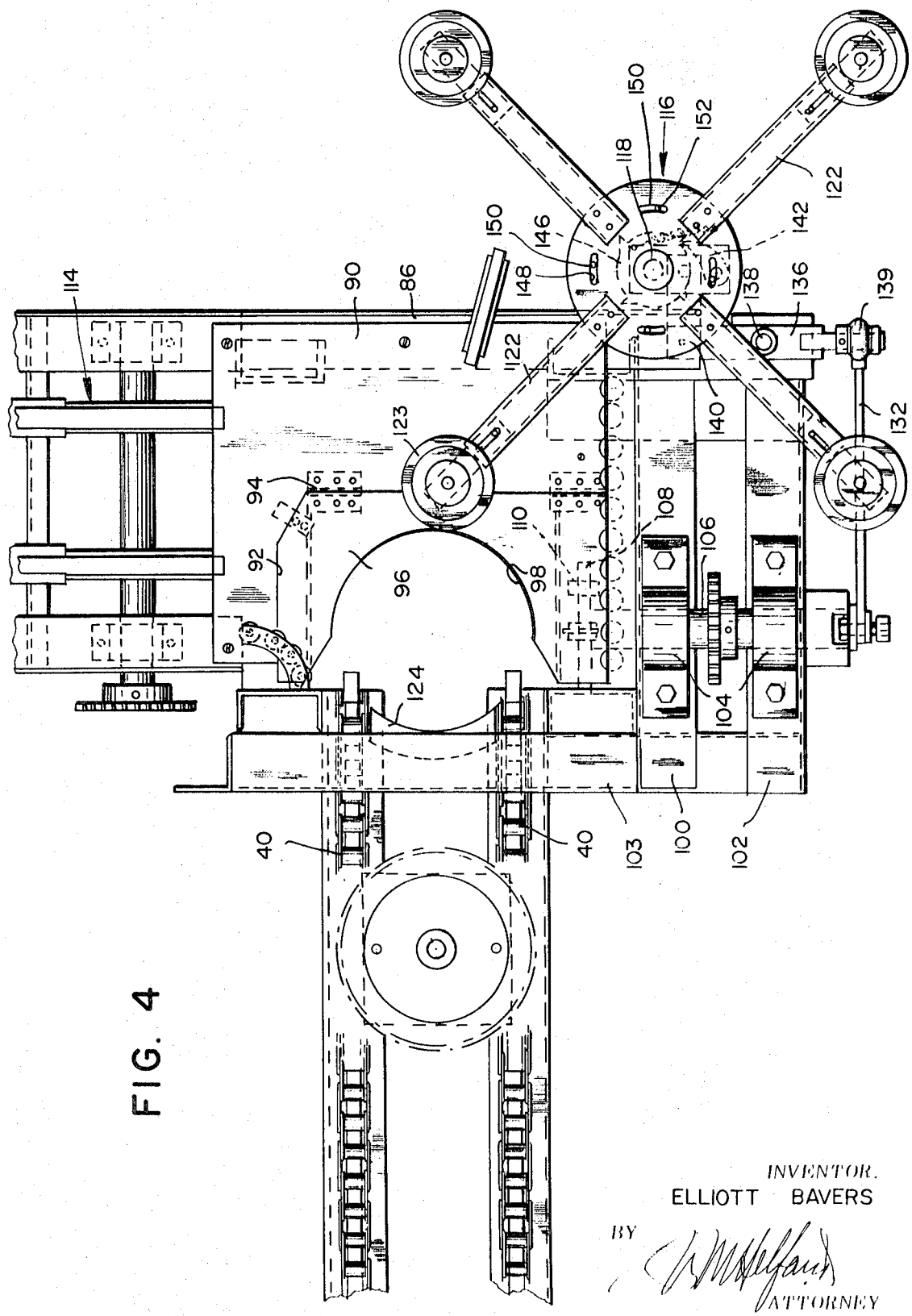
FIG. 4
*INVENTOR.*
ELLIOTT BAVERS
BY
*ATTORNEY*

CONVEYORS FOR ROTATABLY MOVING CONTAINERS

The present invention relates to a conveyor for containers, or the like, and specifically, to a conveyor which rotates the containers, as they are moved along thereby, to expose their surface for uniform surface treatment. More specifically, the present invention relates to conveyors, of the character described, for use with containers having magnetically active bottoms, as of sheet metal.

Conveyors of the general type to which the present invention relates have heretofore been known and used, for conveying containers, such as metal cans, for instance, while rotating them for surface treatment, as for surface spraying with a paint or lacquer or the like, past fixed automatic spraying means. Such conveyors of the prior art generally included an endless belt, or the like, mounting spaced, individual rotatable container-supporting members, each supporting a container, means being provided to rotate the members as the endless belt is moved along. Such conveyors of the prior art presented a number of shortcomings. For one, the position of the container or can upon the rotating platform was more or less precarious, the containers being easily tipped over, and readily shifted upon their supporting platform, to frequently present problems of removal from the platform at the end of the conveying movement. For another, the prior art conveyors did not possess any provision for the regular and accurate automatic placement of the containers upon the rotating supporting members of the conveyor.

It is, therefore, the object of the present invention to provide conveyors, of the character described, with mechanism for the accurate, automatic, mechanical placement of the containers upon the rotating container-supporting members of the conveyor.

It is also an object of the present invention to provide conveyors, of the character described, in which the containers are positively and safely held on the rotating container members against tipping and shifting during the entire conveying and processing cycle of the containers.

It is another object of the present invention to provide conveyors, of the character described, in which the containers may be surely, safely and securely removed from the rotating supporting members.

It is a further object of the present invention to provide conveyors, of the character described, which, despite the foregoing advantages, are of relatively simple construction, certain in operation, simple and easy to use, and economical to produce.

The foregoing and other objects and advantages of the conveyors of the present invention will become more readily apparent to those skilled in the art from the embodiments thereof shown in the accompanying drawing, and from the description following. It is to be understood, however, that such embodiments are shown by way of illustration only, to make the principles and practice of the invention more readily comprehensible, and without any intent of limiting the invention to the specific details therein shown.

In the drawings:

FIG. 2 is a fragmentary side elevation, on an enlarged scale, of the feed end of the conveyor;

FIG. 3 is an end view of the conveyor shown in FIG. 2;

FIG. 4 is a plan view of the feed end of the conveyor with the container-feeding mechanism therefor;

Figure 1:
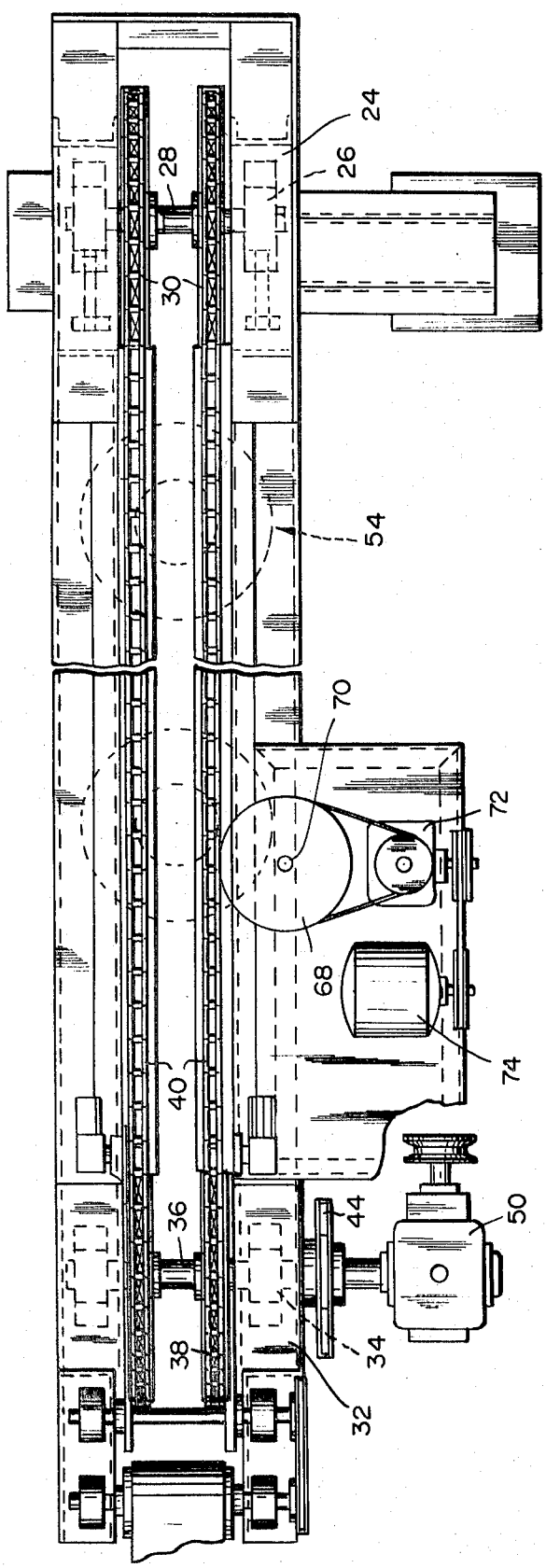
FIG. 1 is a fragmentary, plan view of a conveyor of the type to which the present invention relates, broken to indicate indeterminate length, with a number of container-supporting members indicated in broken lines.

Generally stated, the invention resides in the provision, in a conveyor of the character described, of rotating container-supporting members having magnetized container-supporting platforms that immobilize containers having magnetically reactive bottoms placed thereon, and in the provision of auxiliary feeding mechanism for automatically placing the container on the platforms.

Such mechanism includes a platform adjacent the feed end of the conveyor at a level above the platforms of the container-supporting members; the platform having a hinged leaf extension overlying the feed end of the conveyor and having the cutout portion arranged to register with the platform of a container-supporting member as it is erected at the feed end of the conveyor. Means are provided for conveying containers to the platform and for pushing individual containers from the platform onto the hinged leaf and for downwardly tilting the hinged leaf in synchronism with the positioning of a container-supporting member below its cutout portion, to thereby engage the bottom of the container on the platform of the supporting member.

Referring now in greater detail to the embodiment of the invention illustrated in the drawings, the same show (FIGS. 1, 2, 3 and 6) a more or less standard conveyor for moving and rotating containers, such as cans or the like, 10, which are wholly formed of, or have a bottom, 12, which is formed of, a magnetically active metal, such as of sheet iron or steel, which may preferably be inwardly offset relative to the edge of the container (FIG. 2). While the container is illustrated in the drawings as being cylindrical, it need not be limited to that shape.

The conveyor apparatus consists of an elongated frame including longitudinally spaced stands at the inlet and outlet ends of the conveyor, respectively generally designated as 14 and 16. Each stand 14 and 16 is formed of longitudinally and transversely spaced upright beams, 18, connected by upper and lower longitudinal, horizontal beams, 19 and 20, which may be braced intermediate uprights, 21, and diagonal bars, 22.

Each pair of longitudinally spaced uprights 18 of the inlet end stand 14 supports intermediate its ends a horizontal bar, 24, on which is mounted a bearing, 26; the two bearings 26 journaling a shaft, 28, mounting spaced sprocket wheels, 30. Each pair of longitudinally spaced uprights 18 of the outlet end stand 16 supports a horizontal bar, 32, on which is mounted a bearing, 34; the two bearings 34 journaling a shaft, 36, on which are mounted spaced ratchet wheels, 38. Each pair of sprocket wheels 30 and 38 supports a sprocket chain, 40; the two chains 40 forming the conveyance member of the conveyor apparatus.

One of the shafts, as 36, is formed with an extension that supports a third sprocket wheel, 44, connected by sprocket chain, 46, to a sprocket wheel, 48, mounted on a gear reduction device, 50, driven by motor, 52.

Secured on sprocket chains 40, in spaced relation to one another, are container-supporting stands, each generally designated as 54. Each stand 54 comprises a plate, 56, extending between sprocket chains 40 and secured thereto. Each plate 56 mounts centrally thereof an upright post, 58, on which is rotatably supported, in any desired manner, an upright stud, 60, depending from a container-supporting platform, 62. Each stud 60 is provided at its lower end with a sheave, 64. Sheaves 64 are engaged (FIG. 6) from one side, for rotation of the platform 62, by an endless belt, 66 disposed outwardly of one of the sprocket chains 40, that passes around pulleys, 68 (only one shown); the driven one of which may be mounted on the upright shaft, 70, of a gear reduction mechanism, 72, that is driven by a motor, 74.

It will be readily apparent that motor 52 will move the sprocket chains 40 in an endless path, to erect each stand 54 at the feed end of the conveyor and to invert it at the outlet end of the conveyor. It will also be apparent that motor 74 will move the endless belt 66 that engages within the grooves of the sheaves 64 of the container-supporting members 54 while they are in erect position, to rotate such members while they remain in erect position; the belt 66 terminating its contact with the members 54 at or immediately before the outlet end of the conveyor.

It may here be pointed out that pulleys 68 are disposed in inwardly spaced relation to sprocket wheels 30 and 38, so as to have belt 66 engage only the stands 54 disposed on the central portion of the upper level of sprocket chains 40 between the inlet and outlet ends of the conveyor belt along which portion thereof work is done on the supported cans.

Each container-supporting platform 62 may preferably have a recessed surface, preferably formed by an upright flange, 76, and is provided in its recess with a magnetic element, 78, of any suitable magnetic material. Preferably, the platform 62 is of circular shape and the recess formed by the flange 76 cylindrical, and the magnetic element 78 annular and of rectangular cross section and fitting snugly against flange 76. It will be clear that any container having a magnetically responsible bottom, when set upon a platform 62, will be held securely in place against shifting or tilting by the magnetic element 78, as the container is moved along the conveyor to the outlet end thereof, where the bottom of the container will be gradually elevated off the conveyor by the conventional, spaced endless belts, 80, mounted in upwardly tilted position on rollers, 82.

Supported over frame stand 14, above the level of an erected container-supporting stand 54, as by means of upright extensions, 84, on outer upright beams 18, and horizontal beam, 86, supported thereon, is a table, 90, which is formed with a cutout, 92, in its forward edge, within which is disposed a downwardly tiltable platform or wing, 96, hingedly supported on table 90, as at 94. Wing 96 is likewise formed with a cutout, 98, opening into its forward edge, arranged to overlie the path of stands 54 moving thereunder. Cutout 98 is of a maximum width less than the maximum width of a container and of an area preferably not less than half the area of the bottom of a container 10; the cutout 98 in the illustrated embodiment being semicircular at its inner end to conform with the cross section of the cylindrical container 10 illustrated in the drawings. It will be seen that a container moved onto platform 96 will tend, by its weight, to tilt the platform downwardly and to lower the container supported thereon onto an erected stand 54 passing thereunder.

Figure 5:
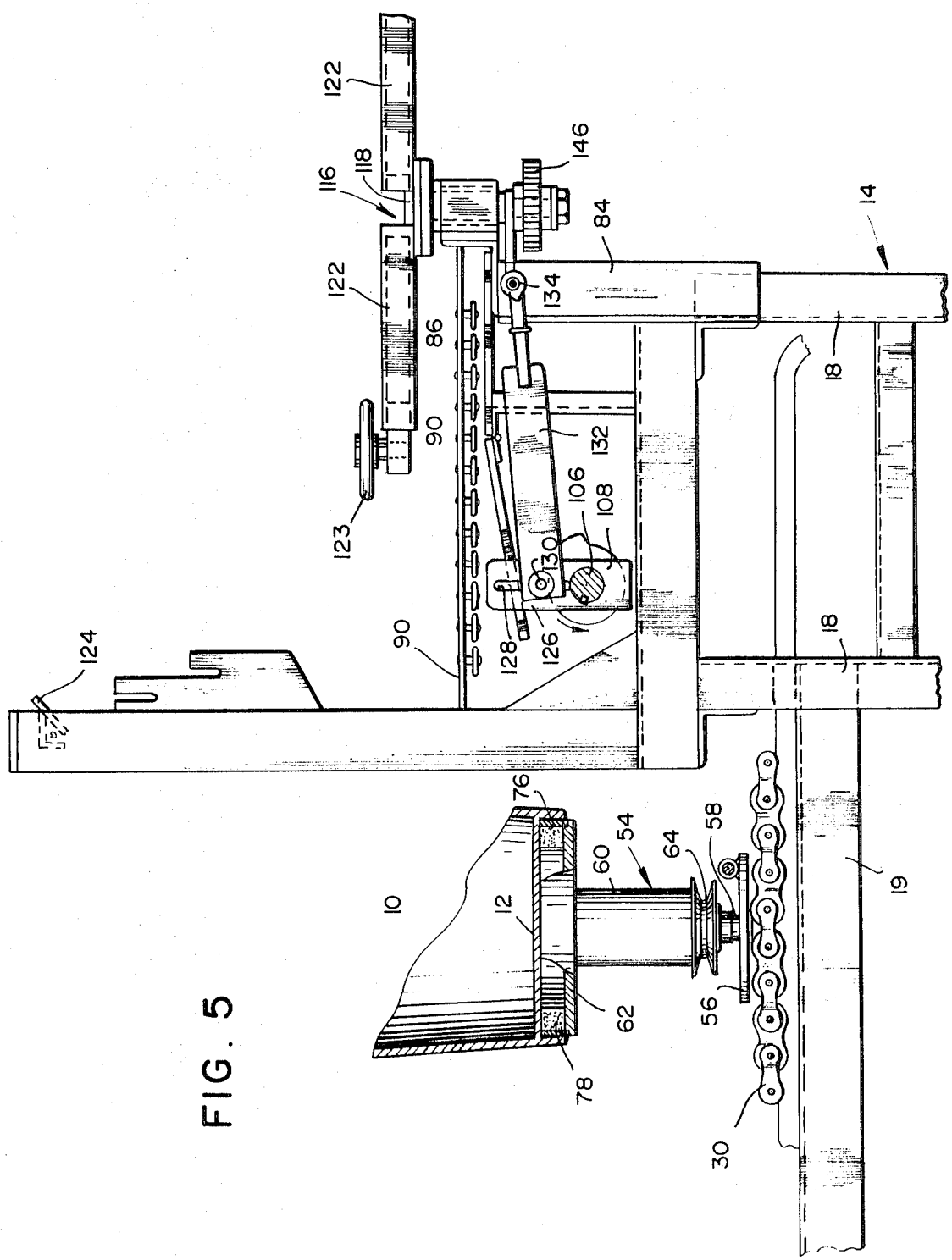
FIG. 5 is a fragmentary, side elevation of the feed end and the container-feeding mechanism of FIG. 4.
Figure 6:
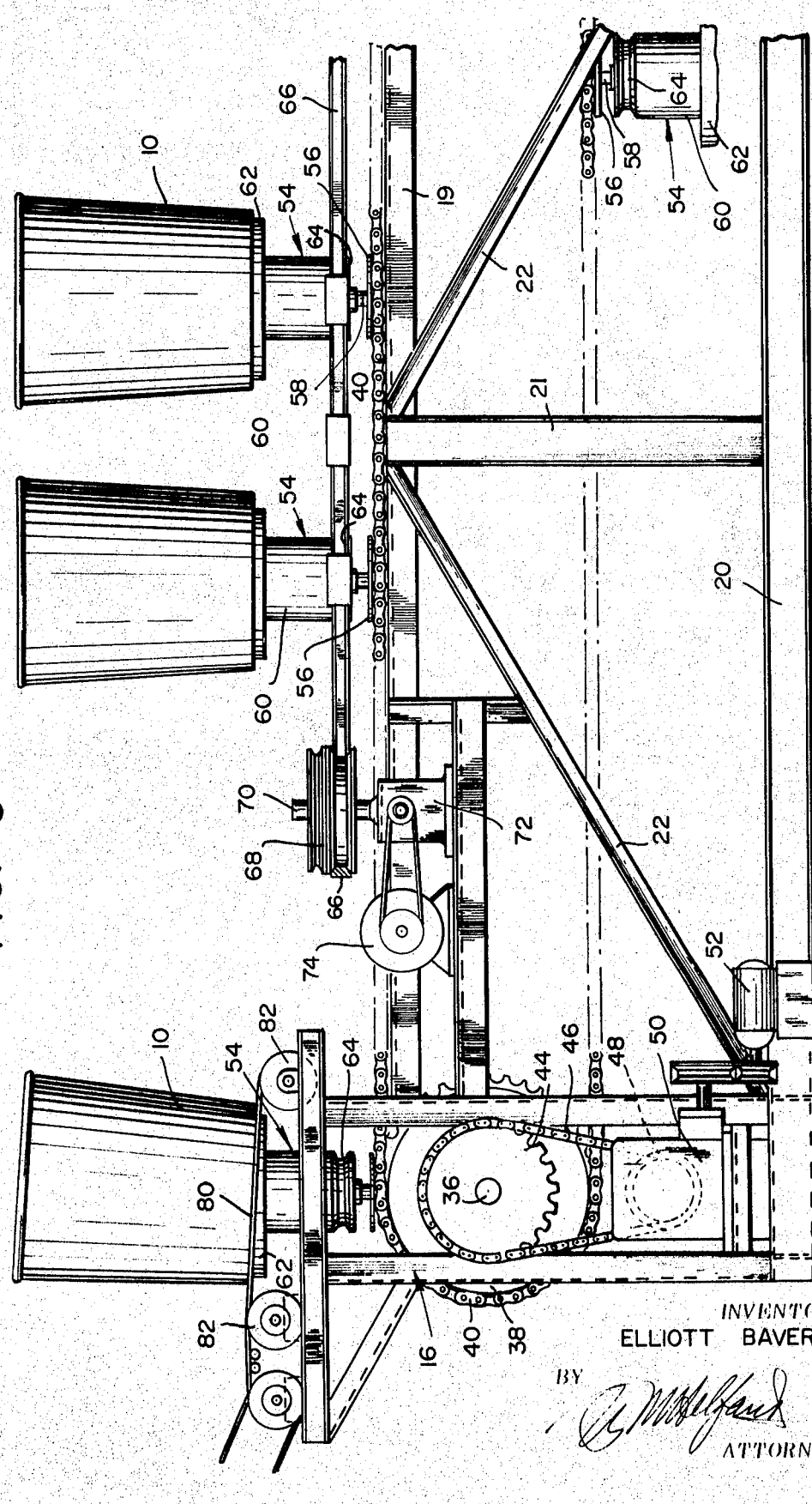
FIG. 6 is an elevational view of the outlet end of the conveyor of the invention.

Means are provided to maintain the wing 96 in horizontal position against the weight of a container resting thereon until a supporting stand 54 is in position to receive and support the container. Such means comprises a pair of horizontally spaced, longitudinally extending bars, 100 and 102 (FIG. 4) supported on horizontal beam 86 and beam, 103, supported on upright extensions of inner beams 18, on which are mounted bearings, 104, that journal a shaft, 106, which mounts a cam, 108, which contacts a follower, 110 (FIG. 5) supported on the bottom of platform 96. Shaft 106 also carries a sprocket wheel, 112 (FIG. 4) which may be operatively connected, in a manner readily understood and not thought necessary to be illustrated, to the conveyor driving motor 52, with a gear ratio such that the low point of the cam 108 underlies the follower 110 each time an erected container-supporting stand 54 is moved below the cutout 98, and that the high point of the cam 108 engages against the cam follower 110 in the interim between the movement away of such stand 54 from below said cutout and the disposal of the next stand below such cutout.

Containers are fed to table 90 by an auxiliary conveyor, generally designated as 114, disposed preferably at right angles to the main conveyor, at a level with table 90. Auxiliary conveyor 114 may be of any suitable type and may be independently operated in any suitable manner. Containers 10 moved unto table 90 may be shifted unto the hinged platform 96 by automatic means regulated to perform in synchronism with the movement of stands 54 and platform-controlling cam 108. Such automatic means may comprise a spider, generally designated as 116, which may be rotatably supported, in any suitable manner, as by upright center shaft, 118, journaled into upright bearing, 120, supported on bar 86 to one side of the longitudinal axis of the main conveyor, and may be provided with one or more arms, 122, such as the four illustrated each of a length to overlie the platform 90 and to engage a container disposed thereon to push it over the opening 98 of the platform 98 as the spider rotates. A container-contacting wheel, 123, may be mounted at each end of each arm 122 to provide smooth, sliding contact between the end of the arm and the container engaged by it.

The rotation of spider 116 may likewise be synchronized with the movement of the conveyor and with the rotation of cam 108, so that a container is engaged by a spider arm 122 and is moved thereby into discharge position on the platform 96 as an erected container-supporting stand 54 is in appropriate position to receive the container sliding from the downwardly tilting platform 96 onto which it has been moved by the spider arm 122.

Means may be provided to inhibit the excessive movement of a container 10, under impulse of a spider arm 122, over platform 96. Such means may be in the form of a stop bar, 124, supported at a downwardly and forwardly disposed angle at a level with the top edge of a container 10 resting on platform 96. Such bar limits the forward movement of the container while platform 96 remains level; but permits its sliding downwardly and forwardly onto a receiving stand 54 when platform 96 is downwardly tilted.

The rotation of spider 116 in synchronism with the movement of cam 108 may be effected in any desirable manner, as by the means illustrated. Such means consists of a link, 126, keyed on cam-supporting shaft 106 and provided with a longitudinally extending groove, 128, within which is engaged a pin, 130, set into the end of a link, 132. The other end of link 132 is connected by a universal joint, 134 (FIG. 4) to the end of a lever, 136, which is disposed at right angles to the link 132 and is pivoted intermediate its ends, as at 138, on rail 86. The other end of the lever 136 carries a rearwardly extending arm, 140, at right angles thereto, on an extension of which is mounted a pawl, 142, that engages a ratchet wheel, 146, that is secured as by a friction clutch on spider-supporting shaft 118.

Escapement may be provided for spider 116 to permit its arms 122 to clear a can positioned on platform 96. To that end, the hub of spider 116 may be provided with arcuate slots, 148, by which it is mounted in spring-tensioned manner, on a disc, 150, secured on shaft 118.

While the means for moving a container from the table 90 onto the platform 96 has been illustrated in the form of a rotating spider, it may here be stated that other means may be utilized for that purpose, such as a single arm mounted for linear reciprocal movement in alignment with the longitudinal axis of the main conveyor.

In operation, containers 10 are fed by the auxiliary conveyor 114 to table 90. As motors 52 and 74 are started to move container-supporting stands 54 and to rotate them, shaft 108 is rotated by the sprocket wheel 112 to rotate link 126 and move link 132 and lever 136 to actuate spider 116 to move a container 10 from table 90 to hinged platform or wing 96 until the top edge of the container abuts the downwardly, rearwardly sloping stop bar 124. The container rests on platform 96 until a supporting stand 54 is moved into register with the cutout 98. Such positioning of the supporting stand 54 is synchronized with the release of the platform 96 by cam 108 for downward tilting; permitting the container 10 to slide down onto the rotating supporting platform of stand 54 and slide past stop bar 124; the container being held securely in place by the magnet 78. As the supporting stand moves away from below platform 96, cam-supporting shaft 106 is rotated to move the cam 108 into platform-raising position and simultaneously rotate link 126 to move pawl 142 into engagement with ratchet 146, to rotate the spider 116 and move a spider arm 122 into engagement with another can on the table 90 and move it into position on the elevated platform 96. The foregoing sequence is continuously repeated.

Each container-supporting member 54 escapes contact with the endless belt 76 as it approaches the outlet end of the conveyor, to cease rotation, and as such supporting member reaches the end of the upper level of the conveyor, the container is picked up at its forward edge and released from the magnet and moved off therefrom by the endless belts 80 to the desired destination.

This completes the description of the apparatus of the present invention. It will be readily apparent that such apparatus is completely automatic once a container is placed on the auxiliary conveyor which moves it onto the table 90. It will also be apparent that the apparatus is completely synchronized and accurate in its operation. It will be further apparent that the apparatus safely and securely holds in place and conveys containers having magnetically active bottoms while they are rotating for surface treatment.

It will be still further apparent that numerous variations and modifications may be made in the container conveying and rotating apparatus of the present invention by anyone skilled in the art, in accordance with the principles of the invention hereinabove set forth, without the use of any inventive ingenuity.

What I claim is:

1. In conveying apparatus for conveying articles while rotating said articles, including an endless conveyor, means for moving said conveyor, rotatable article-supporting stands secured in spaced relation to one another on said endless conveyor, and means rotating said supporting stands when in article-supporting position, automatic means for placing articles successively on said stands, said article-placing means comprising an article-supporting table at a level above the top of said stands when in article-supporting position, means associated with said table for lowering an article upon a stand as said stand passes said table, and means translating an article from said table to said lowering means as said stand passes below said lowering means; said translating means and said lowering means synchronized for movement with the movement of said stands.

2. The conveying apparatus of claim 1, wherein each said stand includes an article-supporting platform, said platform having a magnet set on the article-contacting surface thereof.

3. The conveying apparatus of claim 2, wherein said platform includes an upstanding peripheral flange and said magnet is disposed peripherally within the recess defined by said flange.

4. The conveying apparatus of claim 1, including a second conveyor adapted to convey articles to said table.

5. The conveying apparatus of claim 4, wherein said second conveyor is arranged to move articles to said table in a direction at right angles to the direction of movement of said stand-supporting conveyor.

6. The conveying apparatus of claim 2, wherein said means for lowering an article to the platform of a stand comprises a platform section hinged to said table, said hinged platform section overlying said stand-supporting conveyor, and means automatically downwardly tilting said platform when a stand is moved into position to receive an article from said tilted hinged platform and raising said platform when said stand is moved away from said position; said article-translating means synchronized for moving an article onto said platform when said platform is in raised position.

7. The conveying apparatus of claim 6, wherein said hinged platform is formed with a cutout section opening into its edge facing said stand-supporting conveyor, said opening of a size and shape to support the marginal edge portion of a platform-contacting surface of an article when said platform is in raised position and to gradually disengage from said marginal edge portions as said hinged platform moves into tilted position.

8. The conveying apparatus of claim 6, wherein means are provided for limiting the movement of an article translated onto said hinged platform by said translating means.

9. The conveying apparatus of claim 8, wherein said limiting means comprises a forwardly and downwardly tilted bar supported above said hinged platform, in position for engaging the top of an article resting thereon when said hinged platform is in raised position.

10. The conveying apparatus of claim 6, wherein said means for raising and lowering said hinged platform comprises a shaft rotatably supported below said hinged platform and operatively connected with said conveyor-driving motor, said shaft carrying a cam contacting the underside of said platform and arranged to permit the tilting of said platform when said motor moves said conveyor to dispose a supporting stand in position for receiving an article from said tilted hinged platform and to elevate said hinged platform into raised position when said stand is moved away from said position.

11. The conveying apparatus of claim 10, wherein a link is mounted on said shaft and connected to said translating means to activate the same for moving an article from said table to said hinged platform when the latter is elevated into raised position by said cam.

12. In a conveying apparatus for moving articles while rotating said articles, including an endless conveyor, means for moving said conveyor, rotatable article-supporting stands secured in spaced relation to one another on said endless conveyor and means rotating said supporting stands, said supporting stands each having an article-supporting platform, a magnetic element set into each said stand platform adapted to magnetically hold in place an article having magnetically responsive surface portion resting on said platform.

13. The magnetic conveyor of claim 12, wherein each said platform is formed with an upstanding flange and said magnetic element is disposed adjacent said flange.

14. The conveying apparatus of claim 13, wherein said flange is continuous and said magnetic element is continuous and disposed against said flange.

* * * * *